United States Patent
Zaugg

(10) Patent No.: US 8,328,490 B2
(45) Date of Patent: Dec. 11, 2012

(54) SHEET METAL RIVET WITH ORIENTATION CONTROL

(75) Inventor: Brian C. Zaugg, Millersburg, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 341 days.

(21) Appl. No.: 12/579,151

(22) Filed: Oct. 14, 2009

(65) Prior Publication Data

US 2010/0098516 A1    Apr. 22, 2010

Related U.S. Application Data

(60) Provisional application No. 61/196,492, filed on Oct. 17, 2008.

(51) Int. Cl.
F16B 19/08    (2006.01)

(52) U.S. Cl. .......................... 411/503; 411/461

(58) Field of Classification Search .......... 411/503, 411/457–459, 461, 466, 467, 470, 477, 921, 411/181; 464/68.8, 68.1
See application file for complete search history.

(56) References Cited

U.S. PATENT DOCUMENTS

| | | | | |
|---|---|---|---|---|
| 1,451,121 A | * | 4/1923 | Simpson et al. | 152/368 |
| 2,303,103 A | * | 11/1942 | Adams | 411/460 |
| RE22,758 E | * | 5/1946 | Gisondi | 411/448 |
| 2,616,142 A | * | 11/1952 | Tinnerman | 24/662 |
| 2,797,607 A | * | 7/1957 | Blaski | 411/522 |
| 3,973,295 A | * | 8/1976 | Janke | 269/329 |
| 4,079,656 A | * | 3/1978 | Church | 411/461 |
| D252,851 S | * | 9/1979 | Church | D8/389 |
| 4,229,888 A | * | 10/1980 | Rawson | 36/1 |
| 4,338,039 A | * | 7/1982 | Demonty | 403/230 |
| 4,458,387 A | * | 7/1984 | Pearson | 24/101 B |
| 4,527,933 A | * | 7/1985 | Karhumaki et al. | 411/463 |
| 4,576,535 A | * | 3/1986 | Howering | 411/503 |
| 4,728,237 A | * | 3/1988 | Lorincz et al. | 411/451.5 |
| 5,462,454 A | * | 10/1995 | Kramer et al. | 439/571 |
| 6,126,372 A | * | 10/2000 | Takata | 411/513 |
| 6,305,888 B1 | * | 10/2001 | Leistner | 411/177 |

* cited by examiner

Primary Examiner — Gary Estremsky

(74) Attorney, Agent, or Firm — Simpson & Simpson, PLLC

(57) ABSTRACT

A sheet metal rivet, a body with a centerline and first side and second sides oppositely disposed with respect to the centerline; at least one first protrusion extending from the first side of the body and having a first width; and at least one second protrusion extending from the second side of the body and having a second width. The first and second widths are different or the at least one first and second protrusions are at least partially misaligned in a direction orthogonal to the centerline. In one embodiment, the at least one first and second protrusions include first and second pluralities of protrusions, respectively.

13 Claims, 3 Drawing Sheets

SHEET METAL RIVET WITH ORIENTATION CONTROL

CROSS-REFERENCE TO RELATED APPLICATIONS

This application claims the benefit under 35 U.S.C. §119(e) of U.S. Provisional Application No. 61/196,492 filed Oct. 17, 2008 which application is incorporated herein by reference.

FIELD OF THE INVENTION

The invention relates to sheet metal rivets, and in particular, to a sheet metal rivet having a feature for orientation control.

BACKGROUND OF THE INVENTION

Sheet metal rivets are known in the art. However, in the interest of uniformity these rivets are symmetrically shaped. For example, the rivets are uniformly shaped so that the rivets can be positioned for use regardless of orientation.

BRIEF SUMMARY OF THE INVENTION

The present invention broadly comprises a sheet metal rivet, including: a body with a centerline and first side and second sides oppositely disposed with respect to the centerline; at least one first protrusion extending from the first side of the body and having a first width; and at least one second protrusion extending from the second side of the body and having a second width. The first and second widths are different or the at least one first and second protrusions are at least partially misaligned in a direction orthogonal to the centerline. In one embodiment, the at least one first and second protrusions include first and second pluralities of protrusions, respectively. In another embodiment, the first plurality of protrusions includes first and second protrusions, the second plurality of protrusions includes third and fourth protrusions, and the first and second protrusions have different respective widths or the third and fourth protrusions have different respective widths.

In one embodiment, the first plurality of protrusions includes first and second protrusions, the second plurality of protrusions includes third and fourth protrusions, and a distance between the first and second protrusions is different than a distance between the third and fourth protrusions. In another embodiment, the rivet includes first and second ends through which the center line passes, the first plurality of protrusions includes first and second protrusions, the second plurality of protrusions includes third and fourth protrusions, the first and third protrusions are between the second and fourth protrusions and the first end, and respective distances from the first end to the first and third protrusions are different or respective distances from the second end to the third and fourth protrusions are different.

The present invention also broadly comprises a method for forming a sheet metal rivet.

It is a general object of the present invention to provide a sheet metal rivet with orienting features.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
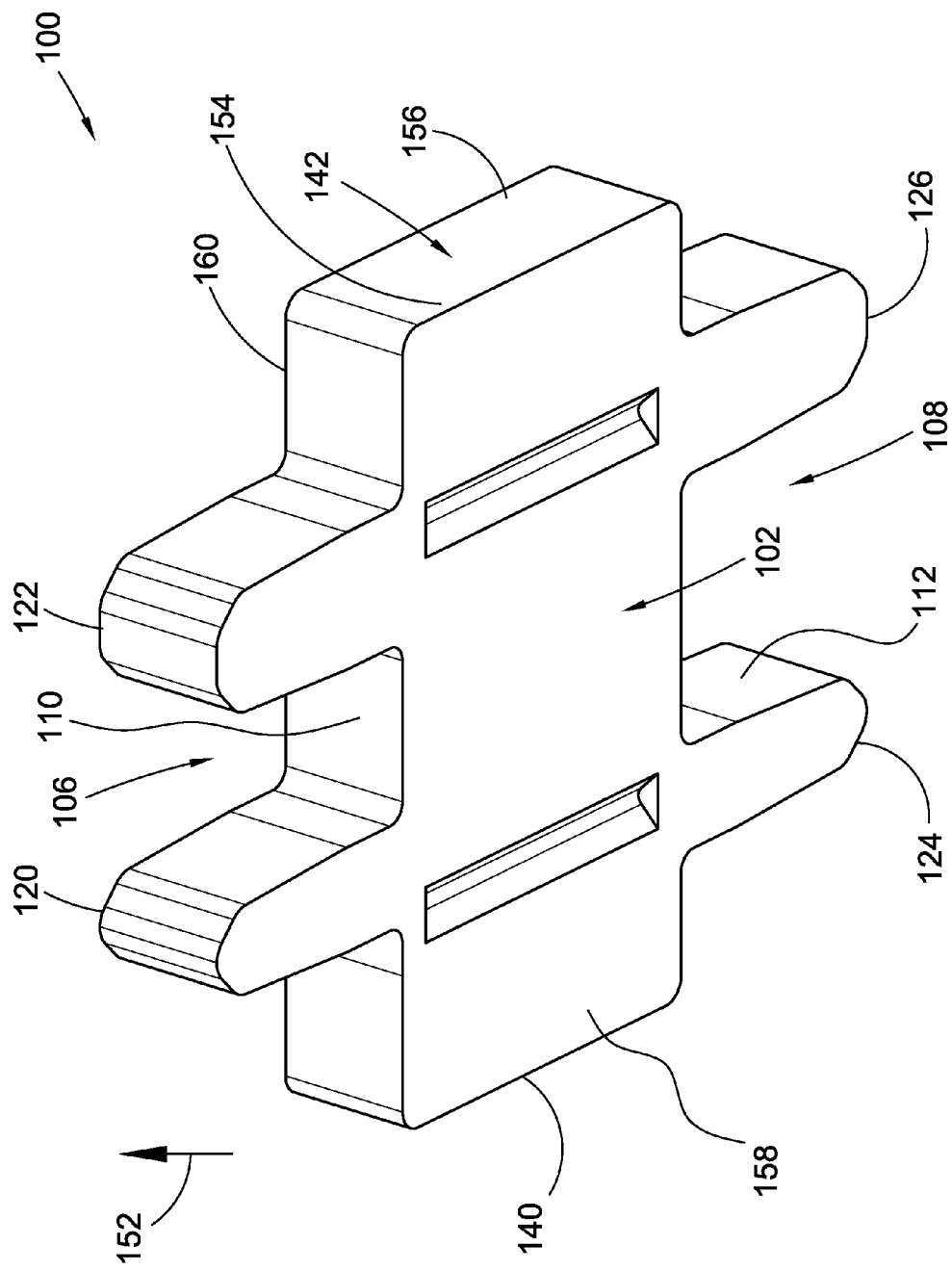
FIG. 1 is a perspective view of a present invention sheet metal rivet.

FIG. 1 is a perspective view of present invention sheet metal rivet 100.

Figure 2:
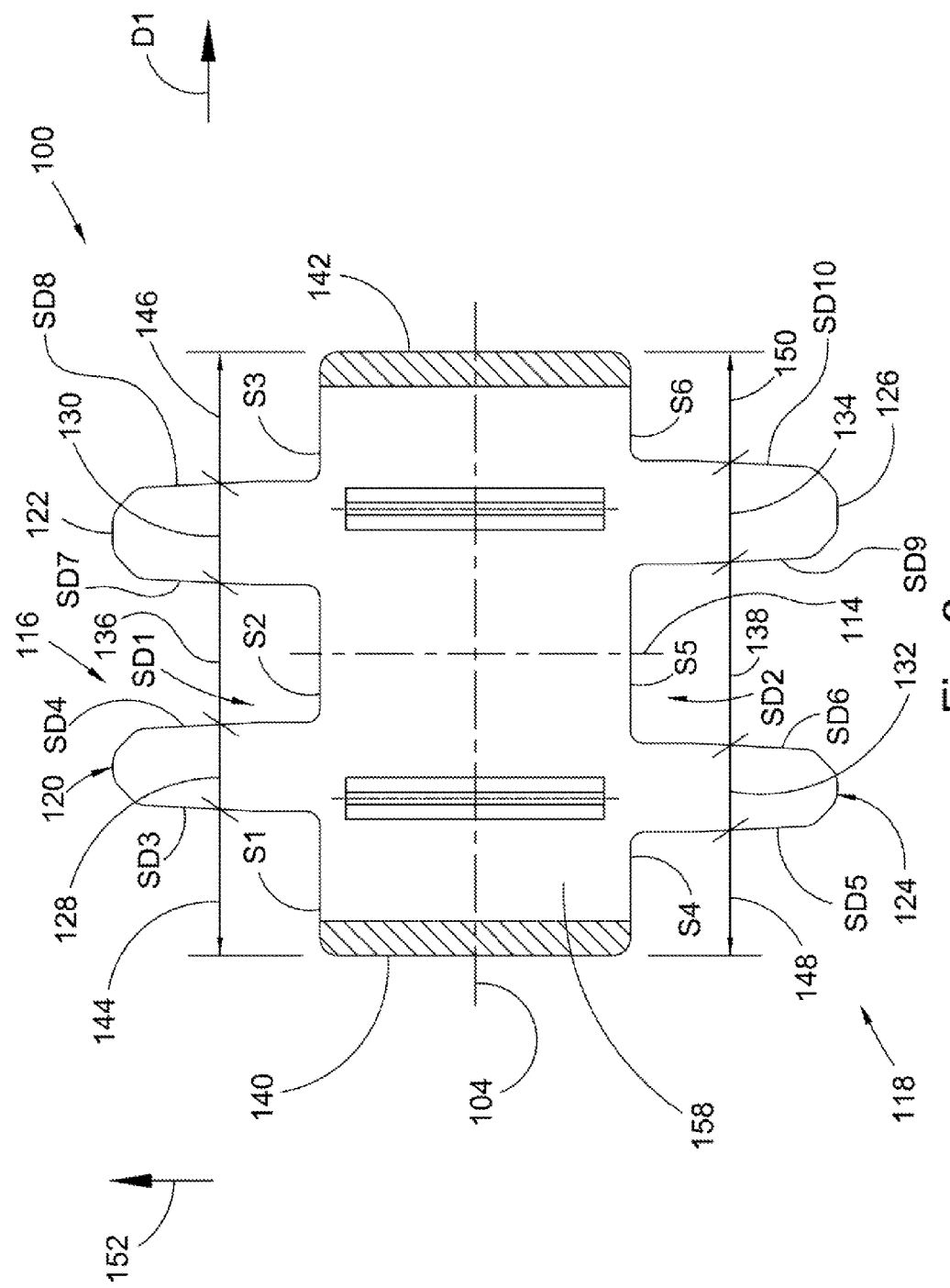
FIG. 2 is a top view of the rivet shown in FIG. 1.

FIG. 2 is a top view of rivet 100 shown in FIG. 1. The following should be viewed in light of FIGS. 1 and 2. Sheet metal rivet 100 includes body 102 with centerline 104 and sides 106 and 108 on opposite sides of the center line. That is, the sides are oppositely disposed with respect to the centerline. Sides 106 and 108 include surfaces 110 and 112 and at least one first protrusion 116 and 118, respectively, extending from sides 106 and 108, respectively. At least one protrusion 116 and 118 include respective widths. In one embodiment, the respective widths are different and in another embodiment, the protrusions are at least partially misaligned in a direction orthogonal to the centerline, for example, parallel to line 114. In one embodiment, the at least one first and second protrusions include first and second pluralities of protrusions, respectively. As further described infra, the asymmetries produced by the different widths or the misalignment can be used to determine an orientation for the rivet to enable the placement of the rivet in a desired orientation as part of an assembly process.

In one embodiment (not shown), at least one first protrusion 116 and 118, are respective single protrusions. In another embodiment, plurality 116 includes two protrusions, for example, protrusions 120 and 122; and plurality 118 includes two protrusions, for example, protrusions 124 and 126. In a further embodiment, protrusions 120 and 122 have different widths 128 and 130, respectively; or protrusions 124 and 126 have different widths 132 and 134, respectively.

In one embodiment, plurality 116 includes two protrusions, for example, protrusions 120 and 122; and plurality 118 includes two protrusions, for example, protrusions 124 and 126 and space, or distance, 136 between protrusions 120 and 122 is different than space, or distance, 138 between protrusions 124 and 126. In another embodiment, plurality 116 includes two protrusions, for example, protrusions 120 and 122; and plurality 118 includes two protrusions, for example, protrusions 124 and 126. The rivet includes ends 140 and 142 through which center line 104 passes. Distances 144 and 148 from protrusions 120 and 124 to end 140, respectively, are different, or distances 146 and 150 from protrusions 122 and 126 to end 142, respectively, are different. In one embodiment, rivet 100 includes side SD1 with surfaces S1, S2, and S3, extending in direction D1 parallel to centerline 104. In one embodiment, rivet 100 includes side SD2 with surfaces S4, S5, and S6, extending in direction D1. In one embodiment, protrusion 120 includes sides SD3 and SD4, and protrusion 124 includes sides SD5 and SD6. In one embodiment, protrusion 122 includes sides SD7 and SD8, and protrusion 126 includes sides SD9 and SD10.

The differences between widths 128 and 130 and widths 132 and 134; the difference between space 136 and space 138; and the differences between distances 144 and 146 or between distances 148 and 150 can be used to enable a specific orientation of rivet 100 when the rivet is positioned for fastening in an assembly. As an example, for a desired orientation of rivet 100, for example, as shown in FIG. 2, specific respective widths for the top, determined with respect to direction 152, protrusions, in this case 120 and 122, are known, as well as the distance between the top protrusions, or the distance from the ends of the rivet to the top protrusions. These widths and distances can be measured or otherwise accounted for to determine if the rivet is indeed oriented as shown in FIG. 2. For example, a sorting process can use the widths and distances to orient rivets 100 as shown in FIG. 2 in preparation for installation. For example, rivets that are not oriented as shown in FIG. 2, for example, the width between the protrusions is different than the width in the desired configuration, could be detected and removed or properly reoriented.

If rivet 100 as shown in FIG. 2 is flipped (not shown) about center line 104, protrusions 124 and 126 will be the top protrusions. However, in this orientation, the distance between the top protrusions will be different than the distance in the desired orientation, specifically, distance 138 is different than distance 136. The sorting process noted supra would detect this difference and signal that the rivet in question was not oriented in the desired configuration. If rivet 100 as shown in FIG. 2 is flipped (not shown) about line 114, protrusions 120 and 122 are still the top protrusions. However, in this orientation, the width of the right-hand and left-hand protrusions will be different than in the desired orientation, specifically, in the desired orientation, the right hand protrusion has width 130, but after flipping about line 114, the right hand protrusion has width 128, different than width 130. The sorting process noted supra would detect this difference and signal that the rivet in question was not oriented in the desired configuration.

Although the dimensions, distances, and widths shown in FIGS. 1 and 2 are with respect to particular points of the portions of rivet 100 in question, for example, the widths of the protrusions, it should be understood that the dimensions, distances, and widths can be with respect to other points of the portions of rivet 100 in question.

Figure 3:
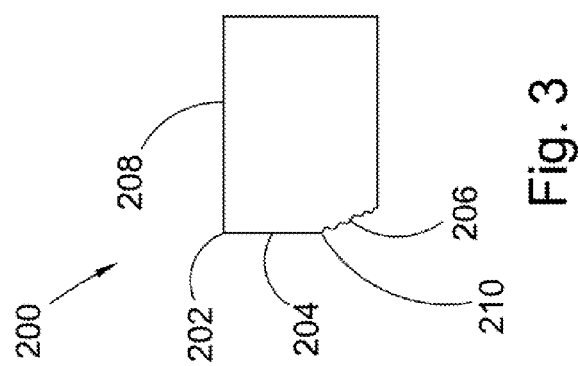
FIG. 3 is a partial side view showing shear and breakout surface in a typical stamped piece; and, FIG. 4 is a perspective view of a series damper using the rivet shown in FIG. 1.

FIG. 3 is a partial side view showing shear and breakout surface in a typical stamped piece. FIG. 3 shows stamped piece 200, stamped at edge 202, resulting in shear surface 204 and breakout surface 206. A stamping process results in two different types of surfaces at the stamped edge, a shear surface and a breakout surface, for example, surfaces 204 and 206. A stamping die (not shown) initially contacted surface 208 and cut through the material for piece 200, producing the relatively smooth shear surface. However, at point 210, the die no longer cut cleanly through the material and the force applied to the die causes the remaining material in the path of the die to break off, resulting in the relatively jagged breakout surface.

Figure 4:
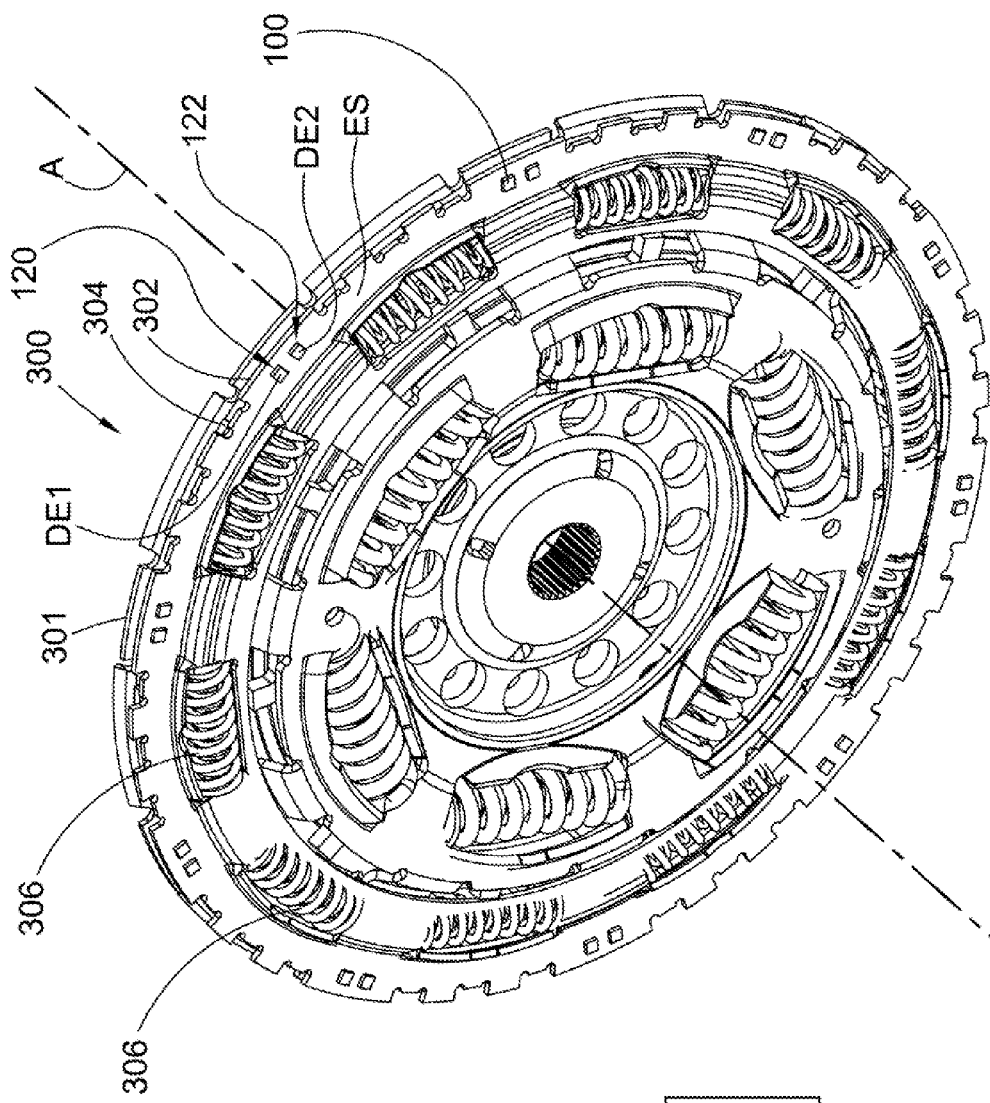

FIG. 4 is a perspective view of series damper 300 using the rivet shown in FIG. 1. The following should be viewed in light of FIGS. 1 through 4. As shown in FIG. 3, a stamped piece, for example, rivet 100, has shear and breakout surfaces at the stamped edges. Damper 300 includes plate 301 and plate 302 with a plurality of tabs 304. Damper 300 also includes a plurality of springs 306 engaged with plate 302. Plate 302 has two travel positions, one in which the rivets are not in contact with the tabs, as shown in FIG. 4, and another in which the rivets contact the tabs to stop rotation of plate 302 (not shown). That is, in the second position, the tab contacts rivet 100 and rivet 100 acts as a stop. Due to the curvature of plate 300, the tab contacts only a portion of an end of the rivet, for example, end 140 or 142, or for example, portion 154 or 156 of end 142, specifically the most radially-inward portion. In terms of function and durability, it is desirable for the portion contacting the tab, that is, the most radially-inward, or lower, portion, to include the shear surface, rather than the breakout surface.

Depending on the orientation of the stamping die used to form rivet 100, shear surfaces formed by the stamping process are continuous with surface 158 or surface 160, on the opposite side of the rivet from surface 158. For example, if surface 158 is facing up during the stamping process, the shear surfaces are continuous with surface 158. Therefore, returning to the example supra, the configuration of rivet 100 and the sorting process, described supra, can be used to ensure that the rivet is oriented for installation in an assembly, for example, damper 300, such that the shear surface on end 140 or 142 is positioned for contact with tab 304. For example, if the shear surfaces are continuous with surface 158, for example, portion 154, the desired orientation for rivet 100 is such that surface 158 is facing radially inward when installed in the damper.

The following should be viewed in light of FIGS. 1 through 4. The following describes a present invention method for stamping a sheet metal rivet. Although the method is presented as a sequence of steps for clarity, no order should be inferred from the sequence unless explicitly stated. A first step forms a body with a centerline and first side and second sides oppositely disposed with respect to the centerline; a second step forms at least one first protrusion extending from the first side of the body and having a first width; and a third step forms at least one second protrusion extending from the second side of the body and having a second width. The first and second widths are different or the at least one first and second protrusions are at least partially misaligned in a direction orthogonal to the centerline.

In one embodiment, the at least one first and second protrusions include first and second pluralities of protrusions, respectively. In another embodiment, the first plurality of protrusions includes first and second protrusions, the second plurality of protrusions includes third and fourth protrusions, and the first and second protrusions have different respective widths or the third and fourth protrusions have different respective widths. In a further embodiment, the first plurality of protrusions includes first and second protrusions, the second plurality of protrusions includes third and fourth protrusions, and a space between the first and second protrusions is different than a space between the third and fourth protrusions.

In one embodiment, a third step forms first and second ends in the body through which the center line passes, the first plurality of protrusions includes first and second protrusions, the second plurality of protrusions includes third and fourth protrusions, the first and third protrusions are between the second and fourth protrusions and the first end, and respective distances from the first end to the first and third protrusions are different or respective distances from the second end to the third and fourth protrusions are different.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A sheet metal rivet, comprising:
    a body with:
        a centerline;
        a first side including first, second and third surfaces extending in a direction parallel to the centerline and aligned with each other;
        a second side oppositely disposed from the first side with respect to the centerline and including fourth, fifth, and sixth surfaces extending in the direction and aligned with each other;
    at least one first protrusion:
        extending from the first side of the body and having a first width;
        including a third side extending from the first surface; and,
        including a fourth side extending from the second surface; and,
    at least one second protrusion:
        extending from the second side of the body and having a second width;
        including a fifth side extending from the fourth surface; and,
        including a sixth side extending from the fifth surface, wherein the first and second widths are different or wherein the at least one first and second protrusions are at least partially misaligned in a direction orthogonal to the centerline.

2. The rivet of claim 1 wherein the at least one first and second protrusions include first and second pluralities of protrusions, respectively.

3. The rivet of claim 2 wherein the first plurality of protrusions includes first and second protrusions, wherein the second plurality of protrusions includes third and fourth protrusions, and wherein the first and second protrusions have different respective widths or the third and fourth protrusions have different respective widths.

4. The rivet of claim 2 wherein the first plurality of protrusions includes first and second protrusions, wherein the second plurality of protrusions includes third and fourth protrusions, and wherein a distance between the first and second protrusions is different than a distance between the third and fourth protrusions.

5. The rivet of claim 2 further comprising first and second ends through which the center line passes, wherein the first plurality of protrusions includes third and fourth protrusions, wherein the second plurality of protrusions includes fifth and sixth protrusions, wherein the third and fifth protrusions are between the fourth and sixth protrusions and the first end, and wherein respective distances from the first end to the third and fifth protrusions are different or wherein respective distances from the second end to the fourth and sixth protrusions are different.

6. The sheet metal rivet of claim 1, wherein:
    the at least one first protrusion includes a first protrusion and a third protrusion;
    the at least one second protrusion includes a second protrusion and a fourth protrusion;
    the third protrusion includes seventh and eighth sides extending from the second and third surfaces, respectively; and,
    the fourth protrusion includes ninth and tenth sides extending from the fifth and sixth surfaces, respectively.

7. The sheet metal rivet of claim 6, comprising first and second oppositely disposed ends, wherein:
    the centerline passes through the ends;
    the first surface is between the first end and the first protrusion;
    the fourth surface is between the first end and the second protrusion;
    the third surface is between the third protrusion and the second end; and,
    the sixth surface is between the fourth protrusion and the second end.

8. A method of stamping a sheet metal rivet, comprising:
    forming a body with a centerline and first side and second sides oppositely disposed with respect to the centerline;
    forming at least one first protrusion extending from the first side of the body and having a first width; and,
    forming at least one second protrusion extending from the second side of the body and having a second width, wherein the first and second widths are different or wherein the at least one first and second protrusions are at least partially misaligned in a direction orthogonal to the centerline.

9. The method of claim 8 wherein the at least one first and second protrusions include first and second pluralities of protrusions, respectively.

10. The method of claim 9 wherein the first plurality of protrusions includes first and second protrusions, wherein the second plurality of protrusions includes third and fourth protrusions, and wherein the first and second protrusions have different respective widths or the third and fourth protrusions have different respective widths.

11. The method of claim 9 wherein the first plurality of protrusions includes first and second protrusions, wherein the second plurality of protrusions includes third and fourth protrusions, and wherein a distance between the first and second protrusions is different than a distance between the third and fourth protrusions.

12. The method of claim 9 further comprising forming first and second ends in the body through which the center line passes, wherein the first plurality of protrusions includes first and second protrusions, wherein the second plurality of protrusions includes third and fourth protrusions, wherein the first and third protrusions are between the second and fourth protrusions and the first end, and wherein respective distances from the first end to the first and third protrusions are different or wherein respective distances from the second end to the third and fourth protrusions are different.

13. A damper, comprising:
an axis of rotation;
a first plate rotatable about the axis of rotation;
a second plate rotatable about the axis of rotation;
a plurality of springs engaged with the first plate; and,
a sheet metal rivet, including:
- a body with a centerline and first and second sides oppositely disposed with respect to the centerline;
- first and second protrusions:
  extending from the first side of the body and through the first plate; and,
  including first and second distal ends extending past an exterior surface of the first plate; and,
- at least one third protrusion extending from the second side of the body.

* * * * *